3,098,420
PHOTOGRAPHIC OBJECTIVES
Hans Sauer and Fritz Köber, Heidenheim (Brenz), Otto Weiss, Aufhausen, Kreis Aalen, Siegfried Grosser, Heidenheim (Brenz), and Karl-Heinz Wöhner, Oberkochen, Wurttemberg, Germany, assignors to Carl Zeiss, Oberkochen, Wurttemberg, Germany
Filed Jan. 4, 1960, Ser. No. 247
Claims priority, application Germany Apr. 29, 1959
4 Claims. (Cl. 95—64)

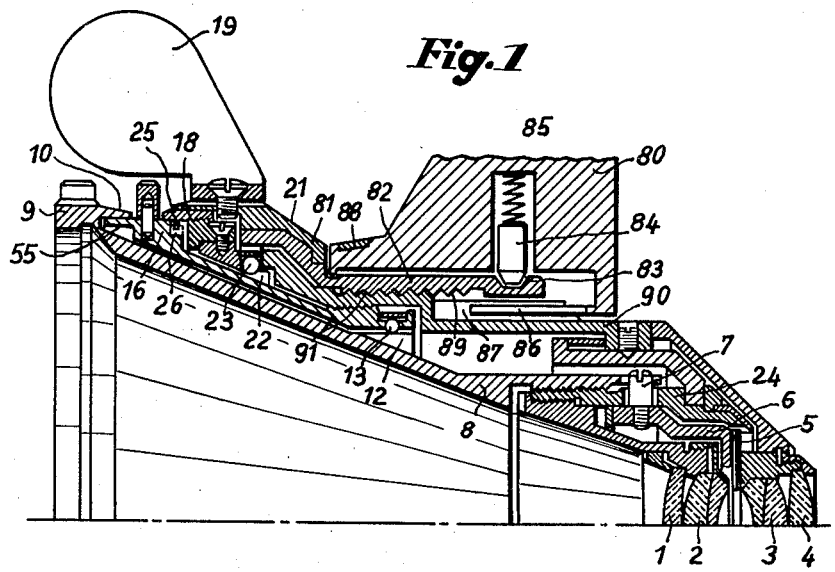
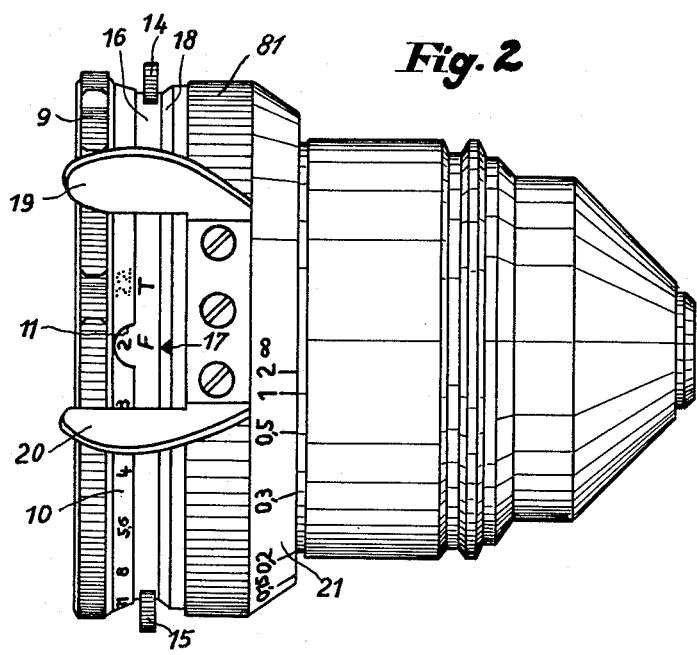

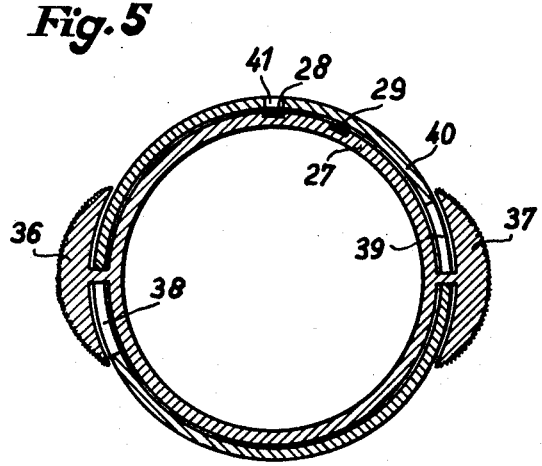
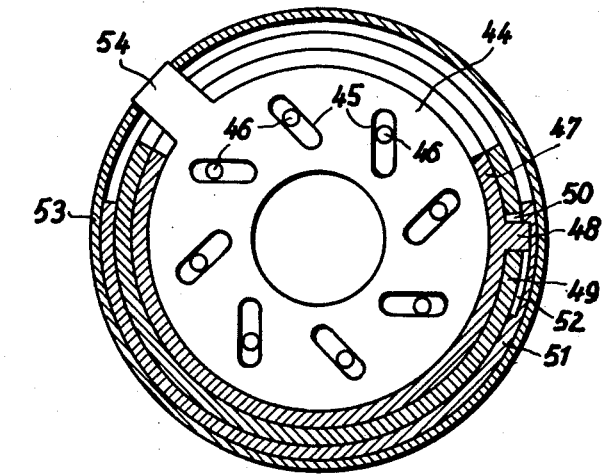

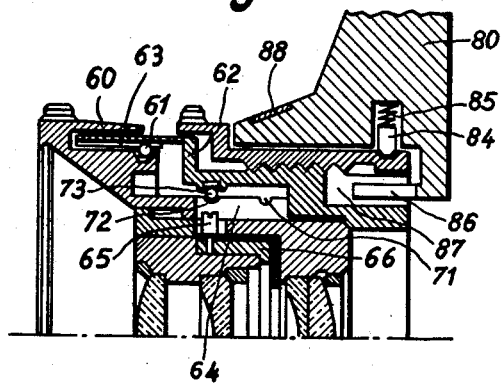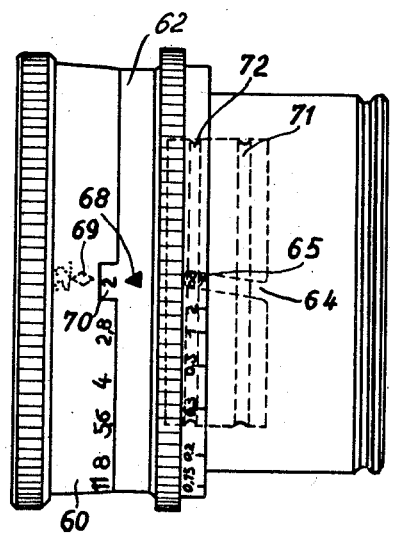

When taking pictures one must admit light to strike a film which has a fixed degree of sensitivity to it. For measuring the amount of light let in to the film, every lens is marked in what are known as $f$/stops. Each stop represents a different size of the opening of the diaphragm, and therefore lets in a different amount of light. An $f$/number is simply a name for a quantity of admitted light. Lenses are marked with these numbers so that one can give the film any given amount of light one wants.

This $f$/system in which the $f$/number is equal to the focal length of the lens divided by the diameter of the diaphragm at any point in its adjustment would work out perfectly if it were not certain factors other than focal length and aperture which also influence the amount of light that a lens transmits. The most important of these are reflections from glass-to-air surfaces and absorption of light by the glass itself. The more elements in a lens, or the thicker the elements, the more light is lost by reflection or absorption.

In order to avoid errors especially in exposing color films with relatively little exposure latitude it is necessary to calibrate the lenses according to actual light transmitted at the various apertures. For embodying the lens transmittance and shape and size of the diaphragm into a single figure which can be engraved on the lens, a new term known as the T-number of a given lens at a given opening is adopted. This T-number is defined as the $f$/number of an open circular hole or of a fictitious lens having 100 percent transmittance and a circular aperture which would give the same central image illumination as the actual lens at the specified stop opening (assuming a very distant object).

The present invention relates to a photographic objective with $f$/ and T-stop.

There are objectives of prior art the mount of which is not only provided with the conventional scale indicating $f$/numbers, but also with a scale indicating T-numbers. These two diaphragm scales are usually disposed one above another, or one after the other, or the scales are arranged to telescope one into the other. In order to distinguish the graduations of the two scales from each other, the same are produced in different colors.

These known objective mounts have several disadvantages. If, for instance both scales are arranged one after the other on the same circumference of the objective and are displaced relative to each other by 180°, a reading of these scales from the same direction of viewing is not possible. The arrangement of the two scales one above the other, or telescopically, is confusing and is not practical and the reading of the scales leads to misadjustments and to errors in exposure. This is particularly true with objectives used in small film cameras, because the space available for the scale graduation is so small that in the ararngement of the two scales one above the other the size of the engraved numerals must be selected to be so small as to endanger the readability of the scales.

It is an object of the present invention to provide for a photographic objective with $f$/ and T-stop the mount of which contains only one scale. This diaphragm scale with its equidistantly arranged scale graduations is placed opposite two indicator marks, which are used for reading the $f$/ and the T-numbers, respectively. These two indicator marks are preferably made distinguishable from each other by making the same of different shape, size, or color, respectively, and by marking same with appropriate symbols.

The distances of the two indicators resulting from the deviations from each other of the $f$/ and the T-stops are usually smaller than a whole diaphragm interval, and attain not by chance the size of one half or one third of the diaphragm interval, i.e. also in fractions of the interval which, in case of some objective mountings, are desirable to have a locking of the diaphragm in certain positions.

It is therefore another object of our invention to provide for a photographic objective a mount with diaphragm locking with a rotatable indicator ring carrying both the indicator marks, which ring may be fixed in two stop positions. This indicator ring can be coupled with a diaphragm stop ring in such a manner that when the indicator ring is rotated from one stop position to the other the locking of the diaphragm will be released. The releasing device is preferably formed in such a manner that the respective invalid indicator mark is covered as long as the diaphragm is in a stop position.

In order to retain the locking of the diaphragm for the reading of the $f$/numbers as well as for the T-numbers, the photographic objective mounting, in accordance with another object of the present invention, is preferably designed in such a manner that the diaphragm stop ring when moving the indicator ring from one position to another (e.g. from $f$/stop to T-stop) is displaced by an amount corresponding to the distance between the $f$/ and the T-stop. The above described arrangement will thus enable that the stop positions of the diaphragm for the $f$/stops, as well as for the T-stops will coincide with the graduations on the diaphragm scale.

It is a further object of this invention to utilize the displacement of the indicator ring for covering the invalid indicator mark.

According to still a further object of the present invention, the locking of the diaphragm is retained for both diaphragm stops, by displacing the diaphragm base relative to the diaphragm groove ring by an amount corresponding to the distance between the $f$/stops and the T-stops during the transfer from one stop to another.

In accordance with a still further object of this invention, the diaphragm stop ring which is connected with the diaphragm scale is designed to be such that same can be displaced in axial direction between two positions fixed by stop-positioning. In this axial displacement the actual diaphragm locking is retained. The two indicator marks are arranged in this modification one after another in axial direction, so that due to the displacement of the diaphragm stop ring the diaphragm scale will be positioned opposite the indicator mark which is valid in this respective position. The diaphragm stop ring is provided with an inclined groove which engages the diaphragm adjusting lever in such a manner that when the diaphragm stop ring is displaced from one stop position into the other said lever will be displaced by an amount corresponding to the distance between the $f$/ and the T-stops.

It is advantageous to provide additional markings which assist in the adjustment of the diaphragm opposite the diaphragm scale when the objective is adapted to receive at its front end attachments which lengthen the time of the exposure, such as color filters, polarisation filters etc. The distances of said additional indicating marks from the normal indicator marks are preferably selected to be such that the changes in the exposure correspond to a factor "2." This will enable a particularly simplified setting of the diaphragm when filters are used in which the filtering factor is indicated in logarithmic units to base 2.

The present invention will now be described on hand of a number of embodiments with reference to the accompanying drawings in which FIG. 1 is an axial section of a photographic objective in accordance with the present invention;

FIG. 2 is a top elevation view of an objective according to FIG. 1;

FIG. 5 shows the indicator ring carrying the two indicator marks with the corresponding covering ring;

FIG. 6 shows a cross-sectional view of another modification of the objective mount of the present invention with a built-in diaphragm and its actuating elements;

FIG. 7 is an axial section of a further modification of the objective of the present invention, and FIG. 8 is a top elevation view of the photographic objective of FIG. 7.

Figure 3:
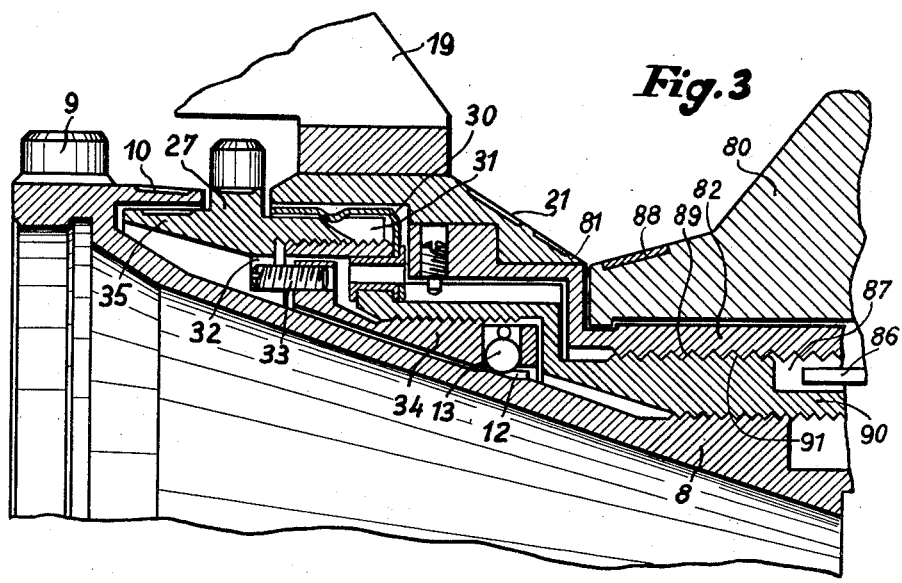
FIG. 3 is an axial section of a modification of an objective of the present invention.

In FIG. 1 the lenses of the photographic objective are designated with numerals 1, 2, 3, and 4, and the diaphragm of the photographic objective is designated with the numeral 5. The diaphragm groove ring for actuating the diaphragm 5 is designated with numeral 6. Said ring 6 is connected by a pin 7 with a sleeve 8 which in turn is in connection with the diaphragm setting ring 9. The diaphragm setting ring 9 carries the diaphragm scale 10 with equidistant intervals and is provided at the place of the smallest diaphragm value with a recess 11 (FIG. 2). The sleeve 8 is provided between its ends with a latching ring 12 which together with a ball 13, which is under spring action, form the locking device of the diaphragm.

A sleeve 16 which surrounds the sleeve 8 is provided with two handles 14 and 15 and carries the two markings F and T. These two markings cooperate with an index mark 17 which is provided on a ring 18.

Two radial wing handles 19 and 20 are used for the adjustment of the distance by rotation of a focusing ring 81 which is provided with a distance scale 21. The focussing ring 81 rotates relative to an index mark 88 provided on the front wall 80 of the camera. During the rotation of the ring 81 no axial displacement of the same takes place.

The focussing ring 81 is integrally formed with a sleeve 82 provided with an interior thread 89. The exterior thread 91 of a sleeve 90 engages said interior thread 89.

The fixed index mark 88 on the front wall 80 of the camera is positioned opposite the distance scale 21. A radial movable latch member 84 in the camera wall 80 is pressed by a spring 85 into a recess 83 of the sleeve 82 and locks it against axial displacement. This arrangement will securely attach the objective to the front wall 80 of the camera casing. The camera front wall is also provided with a projection 86 extending in axial direction of the objective and engaging an axially extending groove 87 in the mounting sleeve 90 of the objective.

During focussing the ring 81 and the sleeve 82 which are integrally connected with each other are rotated by means of the handles 19 and 20. Since the other parts of the objective mount cannot be rotated due to the axial guiding means 86, 87 these parts will therefore be displaced in axial direction owing to the threaded connection 89, 91. The adjustment of the distance will thus displace the entire objective 1, 2, 3, and 4 in axial direction.

The operation of the objective shown in FIGS. 1 and 2 is as follows:

When transferring from the marking F to the marking T the ring 16 is first rotated in clockwise direction when viewing the objective from the left. This ring 16 can be locked in two positions which are determined by the two circumferentially spaced grooves 22 and the ball 23. When the ring 16 is rotated the ball 23 is released from its one groove 22, while the latch 12, 13 remains at first in locked position. This permits a rotation of the diaphragm setting ring 9 until the pin 7 engages the mounting ring 24, provided this adjustment takes place at the greatest opening of the diaphragm. This rotation of the diaphragm setting ring 9 and thus the rotation of the diaphragm latching ring and of the diaphragm groove ring corresponds to approximately the distance between the two markings F and T.

As soon as the pin 7 is stopped, the latch 12, 13 is released and the sleeve 16 can rotate relative to the diaphragm setting ring 9 a distance equal one diaphragm interval. After this rotation the ball 13 will enter into an additional groove of the groove ring 12 and will thus reestablish the locking of the diaphragm.

During the rotation of the sleeve 16 relative to said diaphragm setting ring 9 the numeral "2" arranged on an axial projection 55 of the sleeve 16 will disappear from the recess 11 and when the rotation of the sleeve 16 is terminated, a numeral "2.2" which is also arranged on said axial projection 55 will appear in said recess 11. (The numeral "2.2" represents the starting numeral for the T-stop scale.) At the same time the letter T will be positioned opposite the recess 11.

Shortly before termination of the rotation of the sleeve 16 a radially inwardly extending projection 25 on the ring 18 will engage a radial projection 26 on the sleeve 16, and the ring 18 will now be rotated by an amount which corresponds to the distance between the f/stop and the T-stop. This will rotate the index 17 in such a manner that after termination of the rotation of the sleeve 16 the numeral "2.2," the letter T and the index mark 17 will be in an axially aligned position When the above described adjustment has been completed the numerals which appear during the rotation of the diaphragm setting ring 9 opposite the index 17 will indicate T-numbers.

Figure 4:
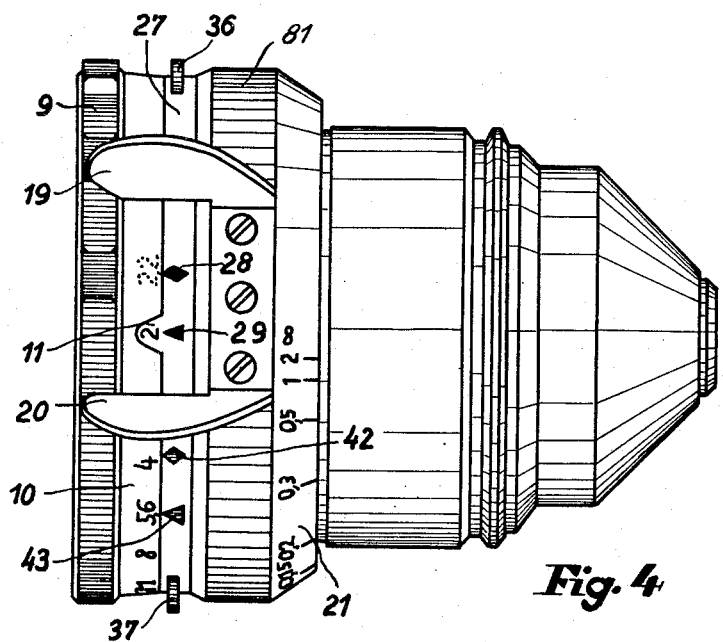
FIG. 4 is a top elevation view of the photographic objective according to FIG. 3.

In the modified embodiment of the invention shown in FIGS. 3 and 4, an index ring 27 having two index marks 28 and 29 is provided opposite the diaphragm scale 10 provided on the diaphragm setting ring 9. The index mark 29 is hereby used for reading the f/numbers and the index mark 28 is used for reading the T-numbers.

The index ring 27 is rotatable and can be locked in two positions determined by the latch 30, 31.

The operation of the switch-over device shown in the FIGS. 3 and 4 is as follows:

In order to switch from f/stop to T-stop the index ring 27 is rotated. This will first release the latch 30, 31 and the ring 27 will then rotate relative to the diaphragm scale 10. The index mark 29 will be hereby moved in downward direction (FIG. 4) and the index mark 28 will be positioned opposite the recess 11. At the same time there will appear in the recess 11 the starting diaphragm number "2.2" which is arranged on the annular projection 35 of the index ring 27. Shortly before the rotation of the ring 27 is terminated, the nose 32 will engage the pin 33, which is connected with a ring 34 carrying a latch ball 13 of the diaphragm latching means.

When the rotation of the ring 27 is continued until the latch 30, 31 is again locked, the sleeve 8 will be rotated by the same amount, due to the locking of the latching means 12, 13. This amount of said rotation corresponds to the distance between the f/stop and the T-stop. The rotation of the sleeve 8 will be transmitted to the diaphragm groove ring and the diaphragm setting ring.

After the rotation of the ring 27 is terminated, i.e. after reestablishing a lock of the latch 30, 31, the numeral "2.2" will appear in the recess 11 and will be positioned opposite the index mark 28. When rotating the diaphragm setting ring 9 the T-numbers will be read opposite the index mark 28.

The photographic objective shown in FIG. 4 may be modified as shown in FIG. 5.

In FIG. 5 a ring 40 is disposed over the index ring 27. The ring 40 is not rotatable and is provided with an aperture 41. The handles 36 and 37 of the index ring 27 extend through the corresponding slots 38 and 39 of the ring 40 so as to not prevent a rotation of the index ring 27. Only the index mark which corresponds to the respective position of the ring 27 will be visible through said aperture 41 in the ring 40.

As shown in FIG. 4 the photographic objective is provided with additional index marks 42 and 43 produced in color which differs from the color of the index marks 28 and 29 and are also displaced relative to said marks in the direction towards the larger diaphragm numbers. These additional index marks 42 and 43 are to be used for an adjustment of the diaphragm when attachments are placed in front of the objective, which attachments require an increase in the exposure time. The cover ring 40 shown in FIG. 5 can easily be provided with an additional aperture in which said two additional marks 42 and 43 may selectively appear.

FIG. 6 shows a diaphragm with its associated actuating elements arranged in a manner in which the diaphragm is built-in into the objective in accordance with a further modification of the present invention. The diaphragm groove ring is indicated with 44 and the diaphragm grooves with 45. Pins 46 which are attached to the diaphragm base 47 engage said grooves. The diaphragm base 47 has a radial projection 48 which engages a slot 50 in a non-rotatable mounting ring 49. A further ring 51 is connected with the index ring (not shown) and will be rotated when a switch-over of the diaphragm takes place from f/stop to T-stop or vice versa. This ring 51 has a groove 52 which is engaged by said projection 48. When the index ring is rotated the ring 51 will also be rotated and will displace the diaphragm base 47. The amount of this displacement corresponds to the distance between the f/stop and the T-stop and is determined by the length of the slot 50.

The actuating ring 51 is surrounded by an additional ring 53 which is engaged by a radial projection 54 on the diaphragm groove ring 44. Said diaphragm groove ring 44 will be adjusted by the ring 53 which is connected with the rotatable diaphragm setting ring.

In the modification of the invention shown in FIG. 6 only the diaphragm base will be adjusted by a switch-over from the f/stop to the T-stop and vice versa, while the diaphragm setting ring and the diaphragm locking ring are not rotated. In the arrangement of this modification, when applied to the objective shown in FIG. 4, only a new start-diaphragm-numeral together with the oppositely disposed index will appear in the recess 11. During this adjustment the diaphragm scale 10 remains stationary.

In the modification of the invention shown in FIGS. 7 and 8, the diaphragm setting ring 60 which is provided with a diaphragm scale carries a spring supported ball 61 which cooperates with a locking ring 63 connected to a stationary index ring 62. Two index marks 68 and 69 in axial spaced relation are arranged on said index ring 62 (FIG. 8). The index mark 68 is used for the reading of the f/numbers, and the index mark 69 is used for reading of the T-numbers. The diaphragm setting ring 60 is provided with a recess 70 and in FIG. 8 the diaphragm value for the respective index mark appears in said recess 70.

The diaphragm setting ring 60 is provided with a groove 64 extending in a direction inclined to the optical axis. The diaphragm adjusting pin 65 which is attached to the diaphragm groove ring 66 engages said inclined groove 64. The diaphragm setting ring 60 is also provided with two annular grooves 71 and 72 which cooperate with a ball 73 which is spring supported in the index ring 62.

The operation of this switch-over device shown in FIGS. 7 and 8 is as follows:

For switching from the f/stop to the T-stop the diaphragm setting ring 60 is displaced in axial direction. The latching means 72, 73 will hereby be released, while the diaphragm latching means 61, 63 will be retained in their locking position. The movement of the diaphragm setting ring 60 in axial direction will be continued until the ball 73 engages the other annular groove 71.

During this movement of the diaphragm setting ring 60 the diaphragm setting pin 65 slides along the inclined groove 64 and will be displaced by an amount corresponding to the distance between the f/stop and the T-stop. At the same time the diaphragm scale is displaced in forward direction and the diaphragm starting numeral "2.2" will appear in the recess 70 and opposite the index mark 69. This index mark is used for the following diaphragm settings.

The use of the present invention is not limited to objective mountings in which the adjustment of the diaphragm aperture takes place directly by hand. The invention can also be used to advantage with objective constructions in which the diaphragm setting ring or a knurled ring for a preselection of the diaphragm is coupled with an exposure meter as in cameras with an automatic or semi-automatic control of the diaphragm aperture.

What we claim is:

1. In a photographic objective provided with an adjustable diaphragm, a rotatable diaphragm setting ring provided with a diaphragm scale thereon, a sleeve on said diaphragm setting ring and connecting the latter with said adjustable diaphragm, an index carrying ring adjacent said diaphragm setting ring and rotatably surrounding said sleeve, said index carrying ring having thereon two selectively usable index marks permitting the reading of f-stops and T-stops respectively, which are arranged opposite said diaphragm scale, said diaphragm scale being provided with uniform spaces between the individual diaphragm numbers, said index marks being circumferentially spaced from each other a distance which is approximately equal to the distance between two adjacent scale lines of said diaphragm scales, and a latching means between said sleeve and said index carrying ring for releasably locking said sleeve and said ring in predetermined positions between the smallest and largest diaphragm number, said positions being spaced apart a distance equal to one diaphragm scale interval.

2. In a photographic objective provided with an adjustable diaphragm, a rotatable diaphragm setting ring provided with a diaphragm scale thereon, a sleeve on said diaphragm setting ring and connecting the latter with said adjustable diaphragm, an index carrying ring adjacent said diaphragm setting ring and rotatably surrounding said sleeve, said index carrying ring having thereon two selectively usable index marks permitting the reading of f-stops and T-stops respectively, which are arranged opposite said diaphragm scale, said diaphragm scale being provided with uniform spaces between the individual diaphragm numbers, said index marks being circumferentially spaced from each other a distance which is approximately equal to the distance between two adjacent scale lines of said diaphragm scales, a latching means between said sleeve and said index carrying ring for releasably locking said sleeve and said ring in predetermined positions between the smallest and largest diaphragm number, said positions being spaced apart a distance equal to one diaphragm scale interval, and an axially movable sleeve for focussing said photographic objective and having mounted therein said adjustable diaphragm and said rotatable sleeve and index carrying ring.

3. In a photographic objective provided with an adjustable diaphragm, a rotatable diaphragm setting ring provided with a diaphragm scale thereon, a sleeve on said diaphragm setting ring and connecting the latter with said adjustable diaphragm, an index carrying ring adjacent said diaphragm setting ring and rotatably surrounding said sleeve, said index carrying ring having thereon two selectively usable index marks permitting the reading of f-stops and T-stops respectively, which are arranged opposite said diaphragm scale, said diaphragm scale being provided with uniform spaces between the individual diaphragm numbers, said index marks being circumferentially spaced from each other a distance which is approximately equal to the distance between two adjacent scale lines of said diaphragm scales, a latching means between said sleeve and said index carrying ring for releasably locking said sleeve and said ring in predetermined positions between the smallest and largest diaphragm number, said positions being spaced apart a distance equal to one diaphragm scale interval, an axially movable sleeve for focussing said photographic objective and having mounted therein said adjustable diaphragm and said rotatable sleeve and index carrying ring, and means for releasably locking said rotatable index carrying ring in two circumferentially spaced positions to said axially movable sleeve, said two circumferentially spaced positions being spaced apart a distance which is equal to the distance between said two selectively usable index marks on said index carrying ring.

4. In a photographic objective provided with an adjustable diaphragm, a rotatable diaphragm setting ring provided with a diaphragm scale thereon, a sleeve on said diaphragm setting ring and connecting the latter with said adjustable diaphragm, an index carrying ring adjacent said diaphragm setting ring and rotatably surrounding said sleeve, said index carrying ring having thereon two selectively usable index marks permitting the reading of f-stops and T-stops respectively, which are arranged opposite said diaphragm scale, said diaphragm scale being provided with uniform spaces between the individual diaphragm numbers, said index marks being circumferentially spaced from each other a distance which is approximately equal to the distance between two adjacent scale lines of said diaphragm scales, and a latching means between said sleeve and said index carrying ring for releasably locking said sleeve and said ring in predetermined positions between the smallest and largest diaphragm number, said positions being spaced apart a distance equal to one diaphragm scale interval, said rotatable diaphragm setting ring being provided with a recess denoting the smallest diaphragm aperture number, and said index carrying ring having an axial projection carrying opposite one of said two index marks thereon a number denoting the smallest diaphragm aperture number which when the diaphragm has been adjusted to this value appears visible in said recess.

References Cited in the file of this patent

UNITED STATES PATENTS

| | | |
|---|---|---|
| 2,443,158 | Eagle et al. | June 8, 1948 |
| 2,541,469 | Guinchard | Feb. 13, 1951 |
| 2,936,690 | Whitman | May 17, 1960 |
| 2,955,519 | Sommer | Oct. 11, 1960 |
| 2,965,011 | Rentschler | Dec. 20, 1960 |

FOREIGN PATENTS

| | | |
|---|---|---|
| 300,619 | Switzerland | Aug. 15, 1954 |